US011080243B2

(12) United States Patent
Nichols et al.

(10) Patent No.: US 11,080,243 B2
(45) Date of Patent: Aug. 3, 2021

(54) SYNCHRONIZING VIRTUALIZED FILE SYSTEMS

(71) Applicant: Microsoft Technology Licensing, LLC, Redmond, WA (US)

(72) Inventors: Jack Allen Nichols, Bothell, WA (US); Jason Fergus Moore, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/700,970

(22) Filed: Sep. 11, 2017

(65) Prior Publication Data
US 2019/0079949 A1   Mar. 14, 2019

(51) Int. Cl.
| G06F 16/178 | (2019.01) |
| G06F 16/14 | (2019.01) |
| G06F 16/176 | (2019.01) |
| G06F 16/188 | (2019.01) |
| G06F 16/182 | (2019.01) |

(52) U.S. Cl.
CPC .......... G06F 16/178 (2019.01); G06F 16/148 (2019.01); G06F 16/176 (2019.01); G06F 16/188 (2019.01); G06F 16/1844 (2019.01)

(58) Field of Classification Search
CPC .... G06F 16/176; G06F 16/178; G06F 16/188; G06F 9/45533; G06F 9/45541; G06F 11/3051; G06F 16/1844; G06F 16/148
See application file for complete search history.

(56) References Cited

U.S. PATENT DOCUMENTS

| 7,281,032 B2 | 10/2007 | Kodama |
| 8,495,012 B2 | 7/2013 | Nagai et al. |
| 9,176,953 B2 | 11/2015 | Donglin |
| 9,633,125 B1 | 4/2017 | Garcia et al. |
| 2007/0156687 A1* | 7/2007 | Idicula ............... G06F 16/1873 |
| 2011/0055299 A1* | 3/2011 | Phillips ............... G06F 9/45533 |
| | | 707/827 |
| 2011/0072059 A1 | 3/2011 | Guarraci |
| 2017/0017551 A1 | 1/2017 | Nichols et al. |

(Continued)

OTHER PUBLICATIONS

Hernandez, Pedro, "Microsoft Adds to OneDrive's Collaboration Features", Retrieved From <>http://www.eweek.com/cloud/microsoft-adds-to-onedrive-s-collaboration-features>>, Aug. 11, 2015, 4 Pages.

(Continued)

Primary Examiner — Truong V Vo
(74) Attorney, Agent, or Firm — Newport IP, LLC; Jacob P. Rohwer

(57) ABSTRACT

This disclosure generally relates to synchronizing a list of queries made against content hosted by a collaborative workspace environment, or against some other remote computing device, to a local computing device. The methods and system described herein enable a synchronization client associated with the local computing device to synchronize one or more queries (e.g., a most recently used file list on the collaborative workspace environment, a list of shared files on the collaborative workspace environment and the like), along with the content associated with the one or more queries, provided on the collaborative workspace environment to the local computing device.

20 Claims, 11 Drawing Sheets

(56) References Cited

U.S. PATENT DOCUMENTS

2017/0147545 A1* 5/2017 Amoli .................. G06Q 10/101
2018/0336520 A1* 11/2018 Davis .................. G06Q 10/101

OTHER PUBLICATIONS

Kaufman, Lori, "How to Use the Google Drive Desktop App to Sync Your Files Anywhere", Retrieved From <<https://web.archive.org/web/20160503121733/http://www.howtogeek.com/228989/how-to-use-the-desktop-google-drive-app/>>, May 2, 2016, 20 Pages.

Moore, Jason, "Allow folders to be shared/co-owned with access/sync the same for all co-owners", Retrieved From <<https://onedrive.uservoice.com/forums/262982-onedrive/suggestions/6325866-allow-folders-to-be-shared-co-owned-with-access-sy>>, Aug. 3, 2015, 5 Pages.

Thurrott, Paul, "Shared Folder Sync is Now Available for (Almost) All OneDrive Users", Retrieved From <<https://www.thurrott.com/cloud/microsoft-consumer-services/onedrive/5175/shared-folder-sync-is-now-available-for-almost-all-onedrive-users>>, Aug. 10, 2015, 8 Pages.

* cited by examiner

SYNCHRONIZING VIRTUALIZED FILE SYSTEMS

BACKGROUND

Collaborative workspace environments typically enable individuals to share content with other individuals that access the collaborative workspace environment. In some cases, files that exist on the collaborative workspace environment are synchronized to a local computing device. However, there is currently no way to synchronize a list of files that exist on the collaborative workspace environment to the local computing device.

It is with respect to these and other general considerations that examples have been described. Also, although relatively specific problems have been discussed, it should be understood that the examples should not be limited to solving the specific problems identified in the background.

SUMMARY

This disclosure generally relates to synchronizing results from a list of queries made against content hosted by a collaborative workspace environment, or against some other remote computing device, to a local computing device. For example, the methods and system described herein enable a synchronization client associated with the local computing device to synchronize one or more queries (e.g., a most recently used file list on the collaborative workspace environment, a list of shared files on the collaborative workspace environment and the like), along with the content associated with the one or more queries, provided on the collaborative workspace environment to the local computing device.

Once the one or more queries have been discovered, the synchronization client generates a special folder or directory that includes the results of each query along with its associated content. In other implementations, one folder or directory may be created for each query result set. The synchronization client may then perform periodic updates to the content in each folder to ensure that the one or more queries, and the content associated with the one or more queries, are synchronized with corresponding queries, and the content associated with the one or more queries, hosted on the collaborative workspace environment.

Accordingly, described herein is a method for synchronizing a list of queries. The method includes generating a request for a list of queries associated with a virtual file system hosted on a collaborative workspace environment. In response to the query, a list of queries is received from the collaborative workspace environment. One or more folders on a local file system may then be generated. In some cases, each of the one or more folders corresponds to at least one query in the list of queries. A request for content that is associated with each query in the list of queries is then generated. In response to this request, the content is received from the collaborative workspace environment.

Also described is a method for synchronizing one or more queries and content associated with the one or more queries between a remote computing device and a local computing device. This method includes generating, by the local computing device, a request for one or more changes to a list of queries associated with a virtual file system hosted on a remote computing device. In some cases, the list of queries is also stored on the local computing device. In response to the request, a list of the one or more changes to the list of queries is received from the remote computing device. Once the list of the one or more changes is received, the local computing device determines whether to download content associated with the one or more changes to the list of queries, delete content associated with the one or more changes to the list of queries, create an entry in a folder associated with the content, and/or move content associated with the one or more changes to the list of queries.

The present disclosure also describes a system that includes at least one processor and a memory coupled to the at least one processor and storing instructions that, when executed by the at least one processor, perform a method for synchronizing one or more queries between a local computing device and a collaborative workspace environment. In some examples, this method includes generating a request for a list of queries associated with a virtual file system hosted on the collaborative workspace environment. In response to the request, the list of queries is received from the collaborative workspace environment. One or more folders may then be generated on a local file system. In some cases, each of the one or more folders corresponds to at least one query in the list of queries. A request for content that is associated with each query in the list of queries may then be generated and provided to the collaborative workspace environment. In response to the request, the content from the collaborative workspace environment may be received.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
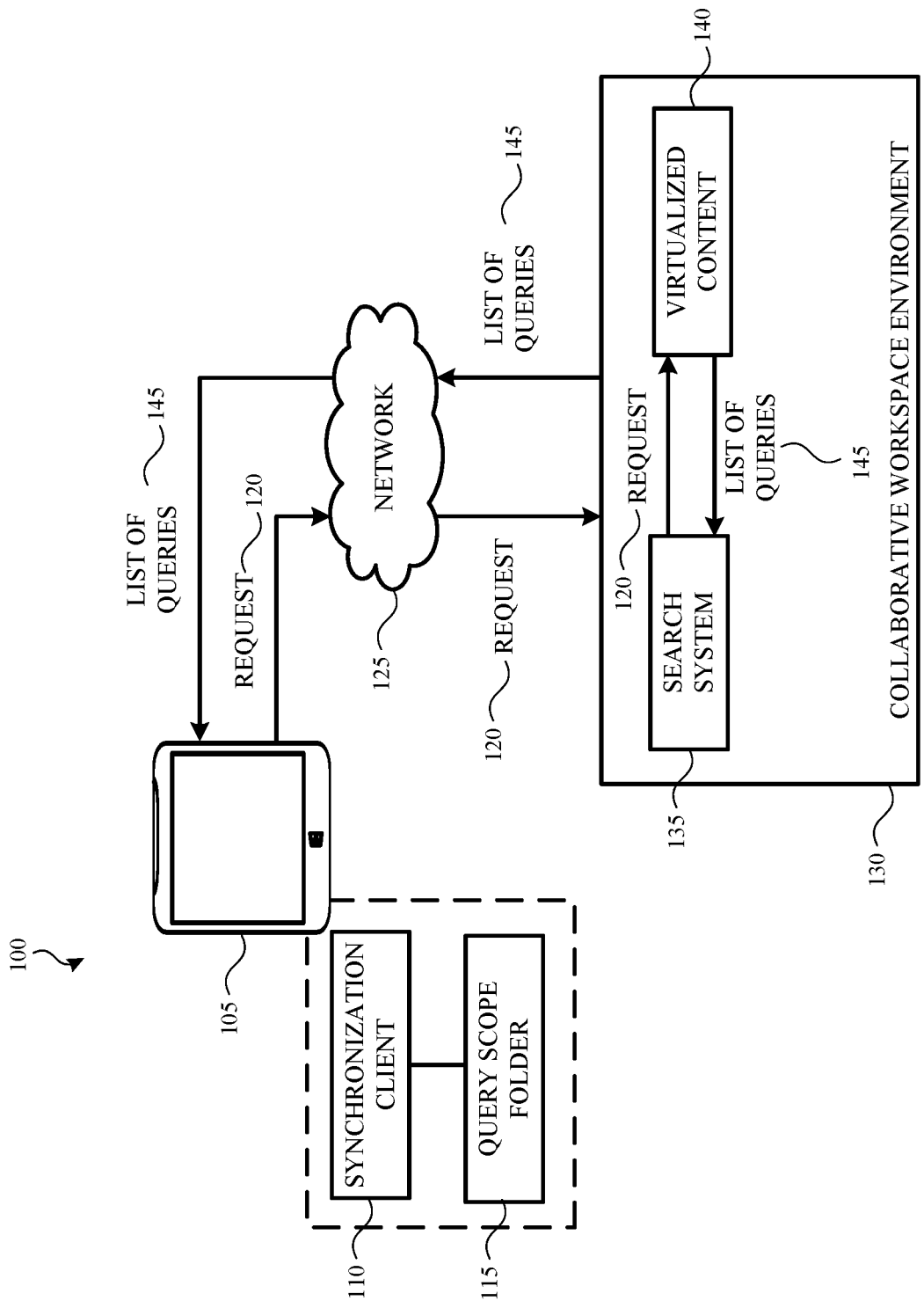
FIG. 1A illustrates a system for synchronizing queries between a local computing device and a remote computing device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Synchronization clients, such as OneDrive from MICROSOFT CORP. of Redmond Wash., are able to synchronize a user's cloud file system across various different devices associated with the user. As such, the cloud's file system may be available on each of the different devices. However, there is currently no way to create a virtualized view of that file system that is viewable on each of these devices.

However, using the system and methods described herein, a synchronization client may synchronize one or more queries, and the content associated with the one or more queries, between the remote computing and the local computing device. For example, the synchronization client may be configured to synchronize a most recently used files list provided on the remote computing device to the local computing device.

In another example, if the remote computing device is a collaborative workspace environment, the synchronization client may be able to synchronize a list of shared files (e.g., files or content that one individual has shared with another individual that accesses the collaborative workspace environment) between the local computing device and the collaborative workspace environment. In the later example, some of the files that are shared between individuals could come from the other individual's cloud file system tree. Thus, the system described in the instant application allows the synchronization client on a local computing device to synchronize content against may different backends associated with various individuals that access the collaborative workspace environment or other cloud storage device or application.

In addition to synchronizing one or more queries between the local computing device and the remote computing device, the synchronization client described herein may also manage the actual content that is synchronized on the local computing device to match the current result of the query, ensuring that any changes to the locally saved content is provided to the remote computing device, and also ensuring that the content that is synchronized to the local computing device is not duplicated with content that is already being (or has been) synchronized.

Accordingly, the methods and system described herein provide a mechanism that allows an individual (e.g., a user or administrator) that accesses a local computing device to specify a set of queries for virtual views of files to synchronize between the local computing device and the remote computing device. Also described is a methodology for a synchronization client associated with the local computing device to discover a list of queries hosted by or provided on the remote computing device and mount each query as an individual folder or directory on the local computing device. The present disclosure also describes how the synchronization engine may discover and receive change notifications from the queries and apply them to the locally saved queries.

The synchronization client may also be configured to handle duplicate content. For example, the same file may appear in a most recently used list on the remote computing device and in a local file system tree of the local computing device. In such case, this content needs to be kept in synchronization.

The synchronization client may also be configured to block illegal changes to content that may occur locally. For example, the synchronization client may block or restrict adds, renames, and other topology changes associated with the content and/or the queries associated with the content.

These and other examples will be described in more detail below with respect to FIG. 1A-FIG. 4.

FIG. 1A illustrates a system 100 for synchronizing queries between a local computing device 105 and a remote computing device such as, for example, a collaborative workspace environment 130, according to an example. Although a collaborative workspace environment 130 is specifically mentioned, the remote computing device may be a cloud computing device, a file hosting service and the like.

The local computing device 105 may be any type of computing device capable of accessing the collaborative workspace environment 130 through a network 125 or other communication medium. Non-limiting examples of a local computing device 105 include, but are not limited to, a laptop computer, a desktop computer, a mobile phone, a tablet computing device, a handheld computing device, a wearable computing device, a video gaming machine and the like.

As shown in FIG. 1A, the local computing device 105 may include a synchronization client 110. The synchronization client 110 is configured to issue one or more requests 120 to the collaborative workspace environment 130. As will be described below, the request 120 may be request for one or more queries associated with a virtual file system hosted on or otherwise provided by the collaborative workspace environment 130, a request for content associated with the one or more queries, and/or a request for updates to content associated with the one or more queries.

The synchronization client 110 may support at least three concepts related to synchronizing content between the local computing device 105 and the collaborative workspace environment 130. The first concept is scope. As referred to herein, the term "scope" means a location from which content is being synchronized. As such, a scope can be a personal folder on the collaborative workspace environment 130, a team site on the collaborative workspace environment and so on.

The second concept is service. As used herein, the term "service" includes information such as the backend address, authentication information, and so forth associated with a query and/or content hosted by the collaborative workspace environment. In some cases, a service is shared amongst all scopes.

The third concept is a query processor. The query processor, also referred to as a search system 135, provides an endpoint (shown as "virtualized content 140") that the synchronization client 110 can query for virtualized content. In some cases, a service administrator can set up or otherwise specify one or more parameters of one or more queries supported on the endpoint.

As such, when the synchronization client 110 transmits a request 120 to the endpoint, the endpoint may return one or more result sets. A result set is a list of results for an associated query. The synchronization client 110 then synchronizes each result set with a new scope or an existing scope. In addition to the above, the synchronization client 110 is also configured to manage the local file system so as to prevent an individual from manipulating it in undesirable ways.

As briefly discussed above, the synchronization client 110 may submit a request 120 to the collaborative workspace environment 130. Each request 120 may return various types of content to the local computing device 105. In one example, the synchronization client 110 may submit one of two different requests 120. The first request, referred to herein as an "enumerate queries" request returns a list of queries that the endpoint supports.

In some instances, the enumerate queries request is used by the synchronization client 110 to mount a scope for each query and/or discover one or more queries hosted by the collaborative workspace environment 130. In some cases, the search system 135 may utilize a discover service or system that is used to discover such queries. In response to the request 120, the search system 135 provides the request 120 to the endpoint or virtualized content 140. In response to receiving the request 120 the virtualized content 140 returns a list of queries 145 that it supports.

Examples of queries that may be included in the list of queries 145 include a "Most Recently Used" list that shows a list of documents or other content that were most recently used or accessed on the collaborative workspace environment 130, a "Shared With Me" list that shows a list of documents or other content that were shared between different individuals that access the collaborative workspace environment 130, a "Needs My Action" list that shows a list of documents or other content that are part of a workflow and for which the individual's attention is requested. Although specific examples are given, these examples are not limiting and the response to the request 120 can return any number of different queries.

Once the list of queries 145 has been determined, it may be transmitted to the local computing device 105 over the network 125. When the list of queries 145 has been received, the synchronization client 110 may generate a directory or folder for each query in the received queries. This is shown in FIG. 1A as query scope folder 115.

In addition to returning the list of queries 145, the collaborative workspace environment 130 may also provide the actual content associated with each document in each query of list of queries 145. For example, if one query in the list of queries 145 included eight documents, each of the eight documents would be provided to the local computing device 105. Once received, the documents may be stored in the query scope folder 115. An individual may then access each of the documents locally and make various changes to the documents such as will be described in more detail below.

In some cases, the synchronization client 110 may submit the enumerate queries request 120 at various times and/or for each scope independently. For example, the synchronization client 110 may submit the enumerate queries request 120 at sign in. In other examples, the enumerate queries request 120 may be issued at various other times or periodically to re-evaluate the scope of each query in the list of queries 145.

When re-evaluating the scope of each query, the synchronization client 110 may issue the enumerate queries request 120 such as described above. In response to the request, the synchronization client 110 receives the list of queries 145. The synchronization client 110 can then check the queries stored in the query scope folder 115 against the list of queries 145.

If a query is known to the synchronization client 110, no action may be required or taken. However, if the query is unknown to the synchronization client 110, the synchronization client 110 determines that this is a new query scope that needs to be mounted. As such, the synchronization client 110 creates a folder for the scope in the query scope folder 115 and updates its state to persist the known scope.

Additionally, if the synchronization client 110 has a known query scope stored in the query scope folder 115 that does not appear in the list of queries 145, this is a query scope that has been removed and needs to be unmounted. As such, the synchronization client 110 may remove the query, as well as its state and associated content, from the query scope folder 115.

Likewise, if a query is known, new content may be discovered and/or added, content within or associated with the query may be edited, and/or items may have been removed. As such, the query, and its associated content may be updated such as will be described in more detail below.

Figure 1B:
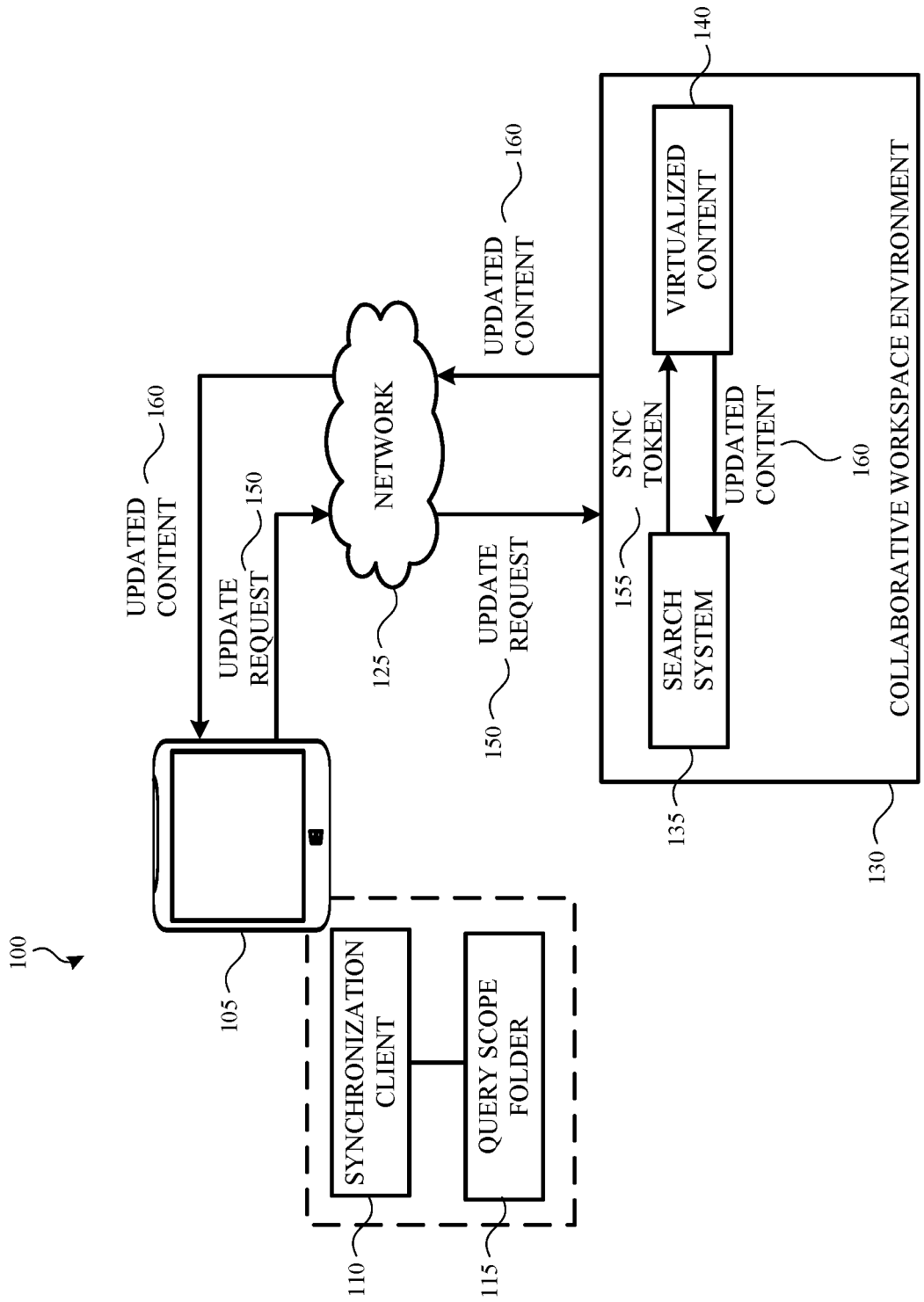
FIG. 1B illustrates the system of FIG. 1A in which a request for updated queries and associated content is provided from the local computing device to the remote computing device according to an example.

FIG. 1B illustrates the system 100 of FIG. 1A in which a request 150 for updated queries and associated content is provided from the local computing device 105 to the remote computing device according to an example. As discussed above, the synchronization client 110 may submit various requests. The description that follows discusses a second request that may be provided from the synchronization client 110 to the collaborative workspace environment 130. This second request is referred to as a "find query changes" request (represented in FIG. 1B as update request 150).

In an example, the synchronization client 110 may periodically issue an update request 150 (e.g., a find query changes request) for each query scope that is mounted or otherwise stored in the query scope folder 115. For example, the update request 150 could be transmitted by the synchronization client 110 in response to a timer expiring. In other examples, a change notification could be provided directly to the synchronization client 110 that informs the synchronization client that content has changed. In yet other examples, the synchronization client 110 may need to register with the collaborative workspace environment 130 to receive notification that a particular query scope has changed.

When a notification that a query scope has been updated is received by the synchronization client 110, the synchronization client 110 submits the update request 150 for the updated query scope. In other examples the synchronization client 110 may submit the update request 150 periodically and does not need to wait for the notification.

The update request 150 is provided to the search system 135. The update request 150 may also include or otherwise be associated with a synchronization token 155. The synchronization token 155 identifies the point in time at which the synchronization client 110 last knew about any changes to a specified query or queries.

In some cases, if a synchronization token 155 is provided to the virtualized content 140, any changes that were made since the time specified by the synchronization token 155 are provided back to the synchronization client 110. If a synchronization token 155 is not provided to the virtualized content 140, any and all changes may be returned to the synchronization client 110. In some instances, the synchronization client 110 stores a last known synchronization token 155 for each query scope in the query scope folder 115.

Once the synchronization token 155 has been provided to the virtualized content 140 to determine the changes, the virtualized content 140 determines which content has been updated and the updated content 160 is returned to the local computing device 105. In some instances, the updated content 160 is a list of content that was updated. In other cases, the updated content 160 includes the actual content of each file and/or query that was updated.

Once the updated content 160 has been received by the local computing device 105, the synchronization client 110 analyzes the changes to determine which changes should be realized, downloaded, created, deleted, moved, and so forth. For example, if the updated content 160 lists five new documents in a recently used query list and those five documents are not stored in the query scope folder 115, the synchronization client 110 would issue a request for those five documents from the collaborative workspace environment 130.

In response to the request, the collaborative workspace environment 130 may provide those five documents to the local computing device 105. Those five documents may then be stored in the query scope folder 115 that is associated with the query that was updated.

In another example, a particular query scope may synchronize ten most recently used items. As new items are used or accessed, items in this scope will be deleted and new ones will be added. As such, the synchronization client 110 may respond by automatically deleting the items that were removed from the list from the query scope folder 115 and automatically adding the new items in order to keep the scope consistent with the query.

As briefly discussed above, files, content or other such items synchronized by the synchronization client may be fully downloaded and stored in the query scope folder 115. In other cases, a placeholder for the file may be downloaded instead of the entire content of the file. As used herein, a placeholder is a special file that has no content, but otherwise contains the other properties of the file (e.g., name, size, timestamp, thumbnail and so on). When a placeholder is used, the contents of the file are downloaded from the collaborative workspace environment "just in time" and populated into the file so the individual that accesses the placeholder can work with the content.

Since query scopes and content may rapidly change, placeholders may be ideal as some content in a query may not every be accessed before it is replaced on a particular query. As such the synchronization client 110 can avoid a series of lengthy full file downloads.

It is also possible that some files associated with a particular query scope may exist elsewhere on a volume associated with the individual that accesses the local computing device 105. For example, if a particular query scope is a request to return the ten most recently used files from the individual's personal site on the collaborative workspace environment 130, and the individual also has the this particular personal site mounted, the files in the query scope may be duplicated. Such duplication may be problematic as the content should be kept consistent. In addition, the duplicate content may unnecessarily take up disk space and/or use bandwidth while being downloaded. In order to solve this potential problem, the system 100 may utilize a placeholder such as described above.

In other cases, the content may only exist in the scope and not be stored in other locations. In such cases, it may also not be desirable to duplicate the content.

A placeholder may solve potential space issues in that content for the file is not downloaded until the individual requests the content (e.g., by clicking on or otherwise selecting the file). Additionally, since the actual content is not downloaded when the file is stored, a sameness issue (e.g., ensuring that multiple copies of the same content remain in sync) is deferred until the file is populated with the actual content.

In other examples, a hard link may be used. A hard link is another name for the same content stored as a separate record in a master file table of the local computing device 105. In some cases, hard linked files are the same file, with another name. As such, files in the query scope can be hard linked to the file elsewhere in another scope. This way, they are the same file, so any sameness issues are resolved. Any potential disk space issue may also be resolved as the content is only stored once.

In some instances, a hard links must live on the same volume as the associated content. However, if the query scope is mounted on a different volume than the main scope, a hard link cannot be used. As such, a shortcut mechanism such as, for example, a symlink or such mechanism that allows a file to be viewed, may be provided and associated with the scope. As briefly described, the shortcut mechanism may allow a particular file to be viewed and interacted with in the query scope, but the actual contents may only reside in one location.

Additionally, the files can be kept in sync manually. The manual synchronization may occur as other content is being synchronized since changing the contents of a file in one location will cause a change notification to be issued for the other.

It is also possible that files in a query scope may not share the same backend or authentication information as the rest of the files associated with an individual. For instance, if individual A shares a file with individual B, there is no guarantee that these individuals are located in the same data center, geography, or backend. Therefore, additional operations may need to be performed in order to synchronize these files.

A first approach is to configure the search system 135 to handle this particular issue. Continuing with the example above, individual B's backend may be configured to return changes, handle downloads and uploads, and everything else for the file, but the backend associated with individual B talks to the backend associated with individual of individual A on behalf of individual B.

A second approach is to enable the synchronization client 110 to handle any potential issues that may arise with this scenario. In this case, the backend associated with individual B may send authentication information and backend information of the backend associated with individual A to the synchronization client 110. Once this information is received, the synchronization client 110 associated with individual B may be able to communicate directly with the backend associated with individual A.

In some cases, it may be desirable to limit one or more changes to the queries and the associated content that is stored on the local computing device 105. As such, any files that are synchronized to a particular query scope and stored in the query scope folder 115 may have the following properties: individuals can edit and read the files but cannot rename, delete, or move the files. Additionally, individuals may be prohibited from deleting, renaming or moving a parent folder. Further, individuals may be prohibited from adding new files to the folder. Although specific examples have been given, other properties may be provided based on a particular implementation. For example, some individuals may be prohibited from performed certain actions while other individuals are permitted to perform those actions.

The above set of restrictions may be enforced by a file system of the local computing device 105. In some cases, an access control list may be used to enforce the set of restrictions. In other cases, a filter may be used to enforce the set of restrictions. For example, the filter may intercept all operations on the files in in the query scope folder 115 and allow or deny the operations based on an identity of the caller. For instance, the synchronization client 110 may be permitted to perform any operation, but all other applications, even administrators may be blocked.

In other implementation, all changes to the files may be allowed. In such cases, the synchronization client 110 may be configured to reverse any changes as needed. For example, if an operation is executed on a document and/or on a query stored on the local device and it was determined that one or more of the changes interfere with a subsequent synchronization process, the process may be reversed. However, it is possible that one or more operations are not reversible. As such, these operations may be strictly prohibited.

Figure 1C:
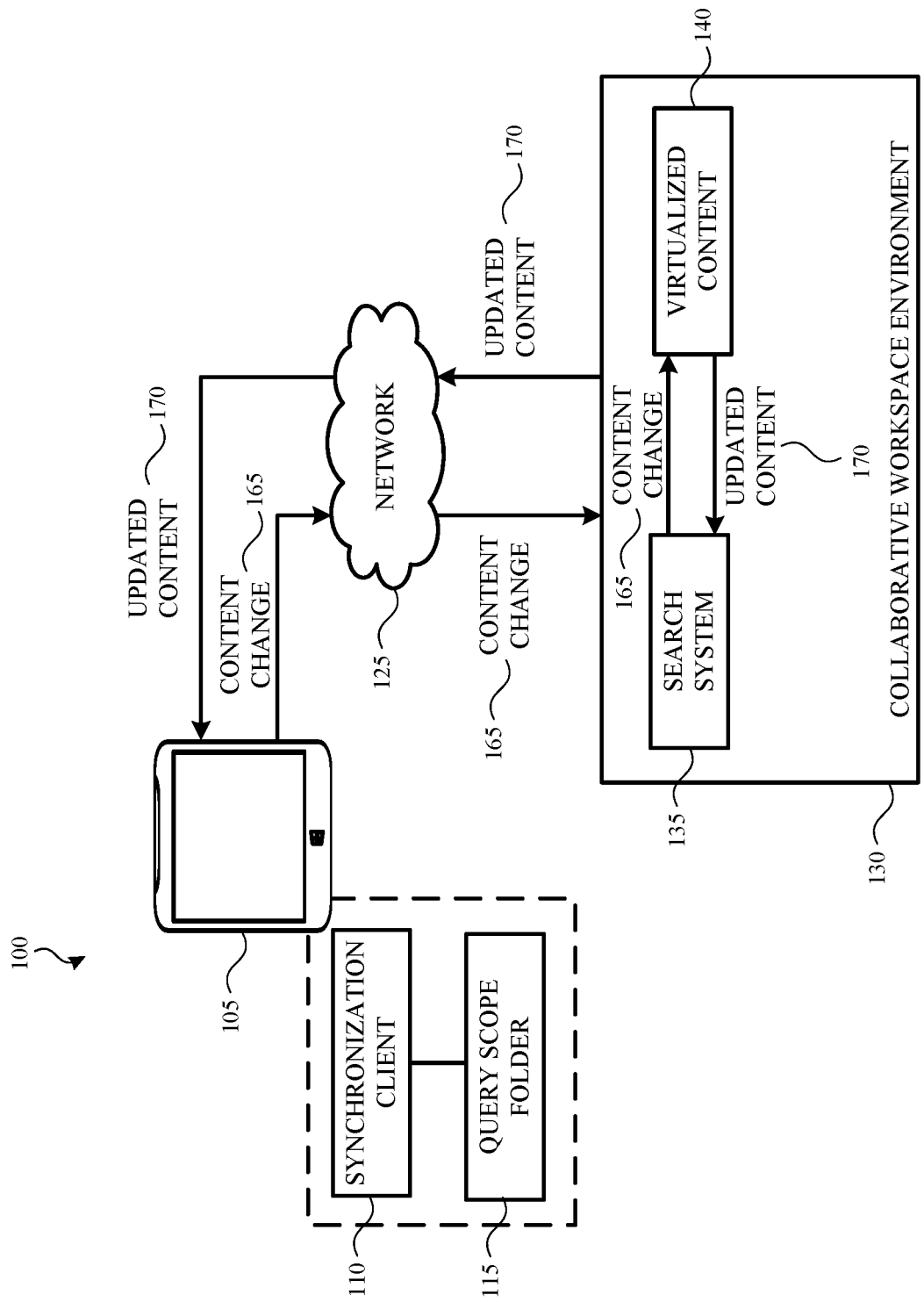
FIG. 1C illustrates the system of FIG. 1A in which local changes to content are provided to the remote computing device according to an example.

FIG. 1C illustrates the system 100 of FIG. 1A in which local changes to content are provided to the remote computing device according to an example. For example, when an individual opens and/or edits a file in a particular query scope, any changes may be provided to the collaborative workspace environment 130.

More specifically, when a file or other content item associated with a query is edited or opened, the synchronization client 110 may detect the type of change to the content. A content change notification 165 may then be provided to the collaborative workspace environment 130.

In some cases, the change notification 165 includes the content or file that was updated as well as any metadata associated with the change. The content change 165 may then be provided by the search system 135 to the virtualized content 140. The virtualized content 140 may accept the changes and provide the updated content 170 back to the synchronization client 110.

As discussed above, certain operations on the files and/or the queries may be prohibited, such as, for example, using a filter. For example, attempts to add content to the folder may be blocked by the filter. Non-content changes (e.g. renames and moves) and deletion operations may also blocked by the filter. Despite these restrictions, conflicts on files may also occur. However, as the synchronization client 110 is not permitted to send an add or rename to the collaborative workspace environment 130, these conflicts may need to be handled separately.

For example, if the file appears in a main tree of a file system associated with an individual, the conflict can be in the main tree and the add for the conflict copy can be sent. However, if the file does not appear in the main tree, the conflict should be treated as a hold in which the file is held. The file may then either be merged with a local copy or the individual may be instructed to select a remote copy or the local copy.

Figure 2:
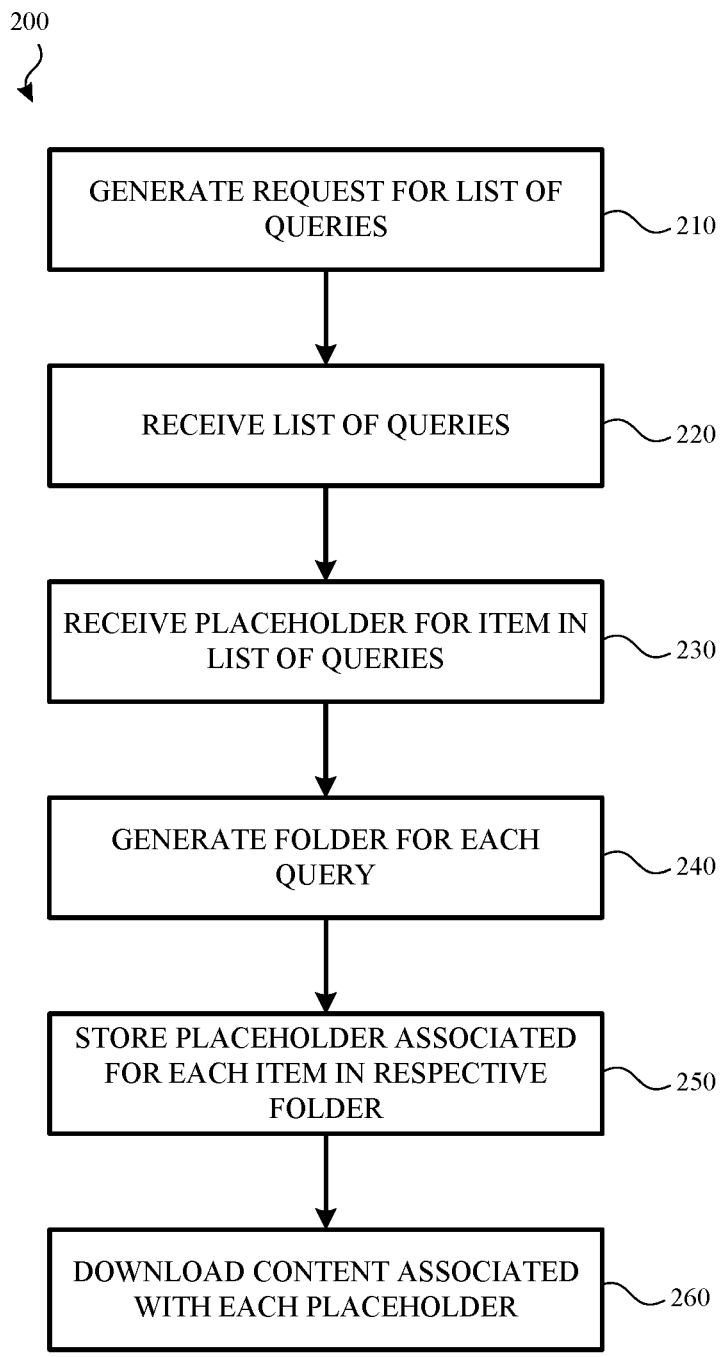
FIG. 2 illustrates a method for synchronizing queries and content associated with the queries between a local computing device and a remote computing device according to an example.

FIG. 2 illustrates a method 200 for synchronizing queries and content associated with the queries between a local computing device and a remote computing device according to an example. In some examples, the method 300 may be used by the various components of the system 100 described above with respect to FIG. 1A-FIG. 1C.

Method 200 begins at operation 210 in which a request for a list of queries is generated. In some cases, the request may be generated by a synchronization client associated with a computing device. In some cases, the request may be generated periodically. In other cases, the request may be generated in response to an event, such as, for example, a sign-on event. Once the request has been generated, the request may be transmitted to a remote computing device.

In operation 220, the list of queries is received. In some example, the list of queries has a specified scope and is associated with a service. The list of queries may also be associated with a virtual file system hosted by the remote computing device. The list of queries may include a list of documents, items, files or other such content that is available on the remote computing device. In some examples, the list of queries may list the documents that were most recently used on the collaborative workspace environment, a list of files that were shared amongst individuals, a list of files for which an individual needs to take action and so on.

In addition to the list of queries being received, operation 230 provides that a placeholder for each item listed in each query in the list of queries is also received. Although a placeholder is specifically mentioned, the entire content of the file may be downloaded, a symlink may be downloaded and so on.

In some cases, operation 230 may be performed when the synchronization client issues a subsequent request. For example, the first request may be a request for a list of queries hosted by the remote computing device and, once the list is returned, the synchronization client may issue a separate request for the content associated with entry in each query of the list of queries.

Flow then proceeds to operation 240 and the synchronization client generates a folder for each query. In some instances, operation 240 may occur before operation 230. In other cases, operation 240 may occur substantially simultaneously with operation 230.

Flow then proceeds to operation 250 and the content that was received as a result of the request being submitted is stored in its associated folder. As described above, each folder may be associated with a set of restrictions or permissions that describe one or more operations that are permitted and prohibited on the folder and on the content stored within the folder.

In operation 260 the content associated with each placeholder is downloaded and stored in the folder. In some instances, operation 260 is not performed unless a particular content item within the folder is selected. As such, the entire contents of the file will not be downloaded from the remote computing device unless the content is actually needed.

Figure 3:
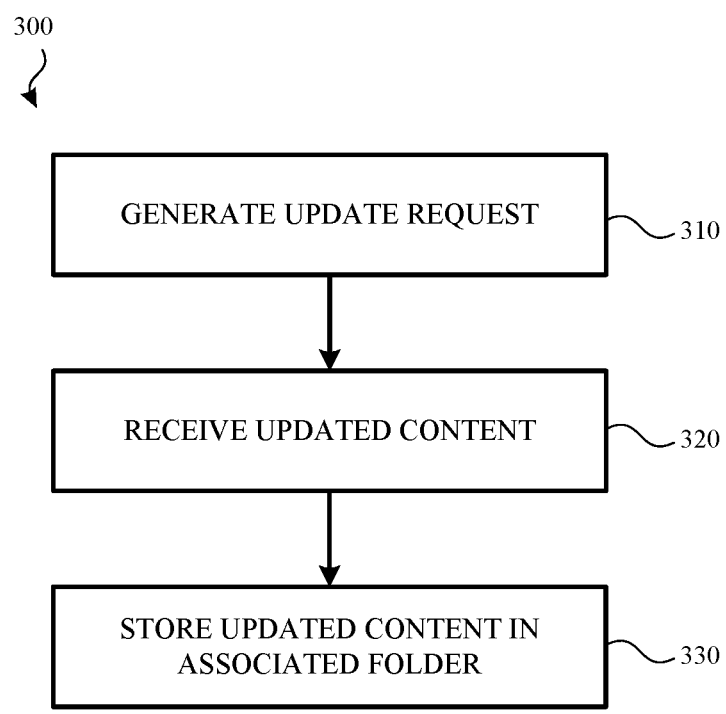
FIG. 3 illustrates a method for receiving one or more updates to a query and content associated with the query according to an example.

FIG. 3 illustrates a method 300 for receiving one or more updates to a query and for receiving content associated with the query according to an example. The method 300 may be executed by one or more of the components of the system 100 described above with respect to FIG. 1A-FIG. 1C.

Method 300 begins at operation 310 in which a synchronization client associated with a local computing device generates an update request. In some instances, the update request is generated in response to the synchronization client receiving a notification from a remote computing device that content on the remote computing device has been updated. In other examples, the request may be generated periodically by the synchronization client.

Once the request has been generated and provided to the remote computing device, flow proceeds to operation 320 and updated content is received from the remote computing device. In some instances, the updated content may be a list of content and/or queries that have changed. In such cases, the synchronization client may be configured to issue a second request for the updated content such as described above.

In other cases, the updated content may include the list of changes as well as the actual content that was updated. Although the actual content is mentioned, it should be appreciated that a placeholder, a hard link and/or a symlink may be provided to the synchronization client in response to the update request.

Flow then proceeds to operation 330 and the updated content is stored in its associated directory or folder. In some instances, operation 330 may include deleting content in a particular folder, adding content to a particular folder, deleting a folder and its associated content, moving content from one folder to a different folder and the like.

Figure 4:
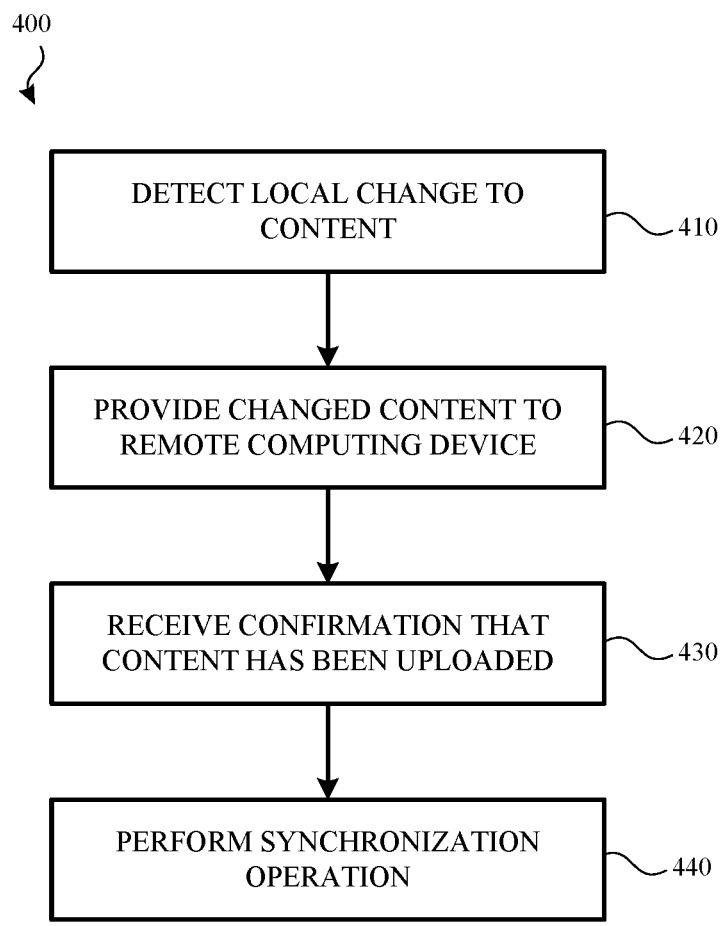
FIG. 4 illustrates a method for providing changes made to locally stored content to a remote computing device according to an example.

FIG. 4 illustrates a method 400 for providing changes made to local content to a remote computing device according to an example. In some cases, the method 400 may be executed by one or more of the components of the system 100 described above with respect to FIG. 1A-FIG. 1C.

Method 400 begins at operation 410 in which one or more changes to local content are detected. In some instances, a synchronization client may be used to determine or otherwise detect various changes that are made to the local content and/or a query associated with the local content.

Once the changes are determined, flow proceeds to operation 420 and the changed content is provided to the remote computing device. In some cases, metadata associated with the changed content may also be provided to the remote computing device. When the changes to the content are received, the remote computing device may synchronize the received content with the original content that is hosts.

Flow then proceeds to operation 430 and the synchronization client receives confirmation that the updated content has been accepted by the remote computing device and/or applied to the content stored on the remote computing device. Flow then proceeds to operation 440 and the synchronization client may again request that the locally stored content and the content stored on the remote computing device are again synchronized.

FIG. 5-FIG. 8 and their associated descriptions provide a discussion of a variety of operating environments in which aspects of the disclosure may be practiced. However, the devices and systems illustrated and discussed with respect to FIG. 5-FIG. 8 are for purposes of example and illustration and is not limiting of a vast number of electronic device configurations that may be utilized for practicing aspects of the disclosure, as described herein.

Figure 5:
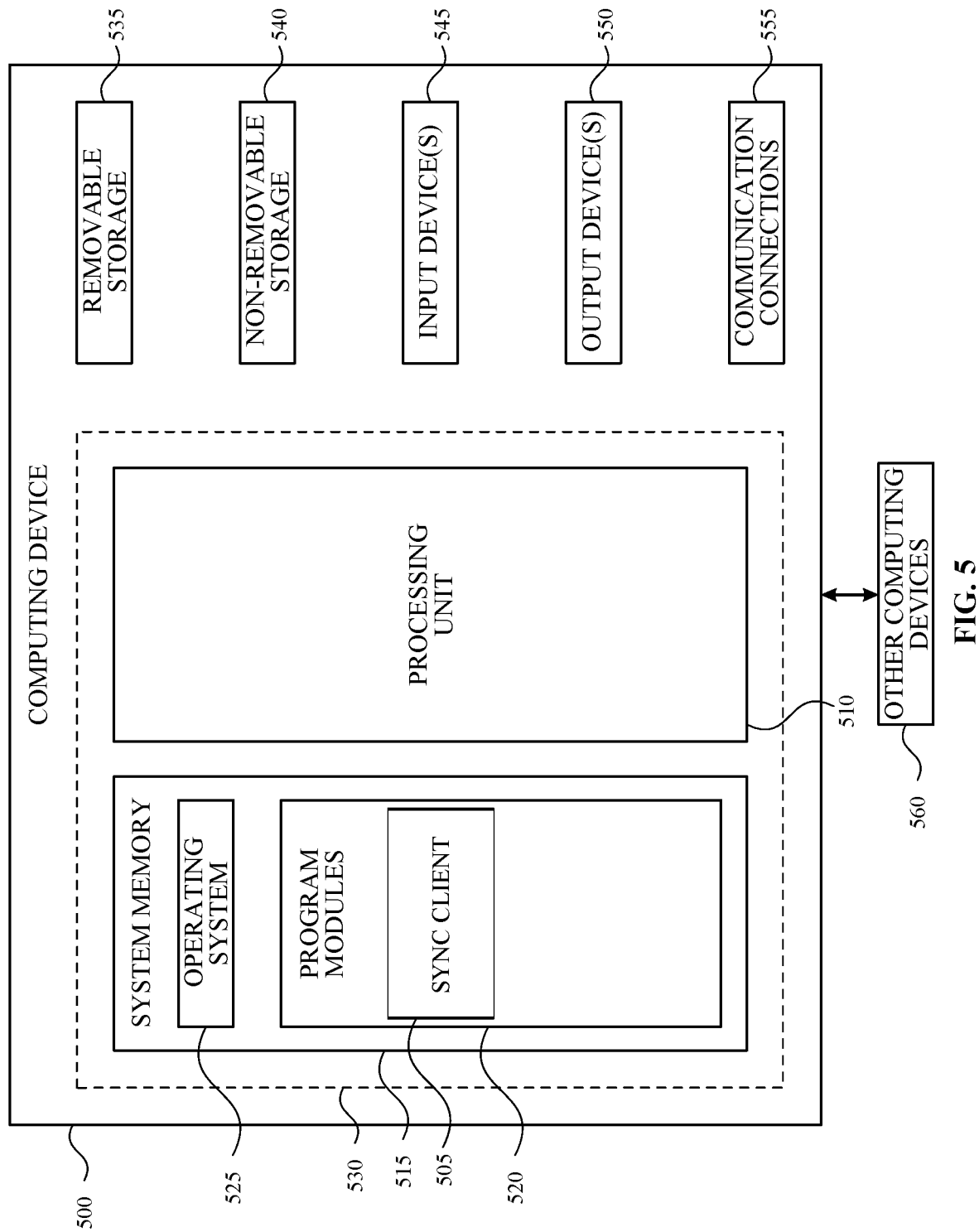
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device 500 may be similar to the local computing device 105 described above with respect to FIG. 1A. Additionally or alternatively, the computing device 500, or the various components described in conjunction with the computing device 500, may be used with, may be part of or may be integrated with the collaborative workspace environment 135. The components of the computing 500 described below may have computer executable instructions for synchronizing virtual file systems such as described above.

In a basic configuration, the computing device 500 may include at least one processing unit 510 and a system memory 515. Depending on the configuration and type of computing device 500, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 or components suitable for identifying various objects contained within captured images such as described herein.

The operating system 525, for example, may be suitable for controlling the operation of the computing device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., a synchronization client 505) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other computing devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
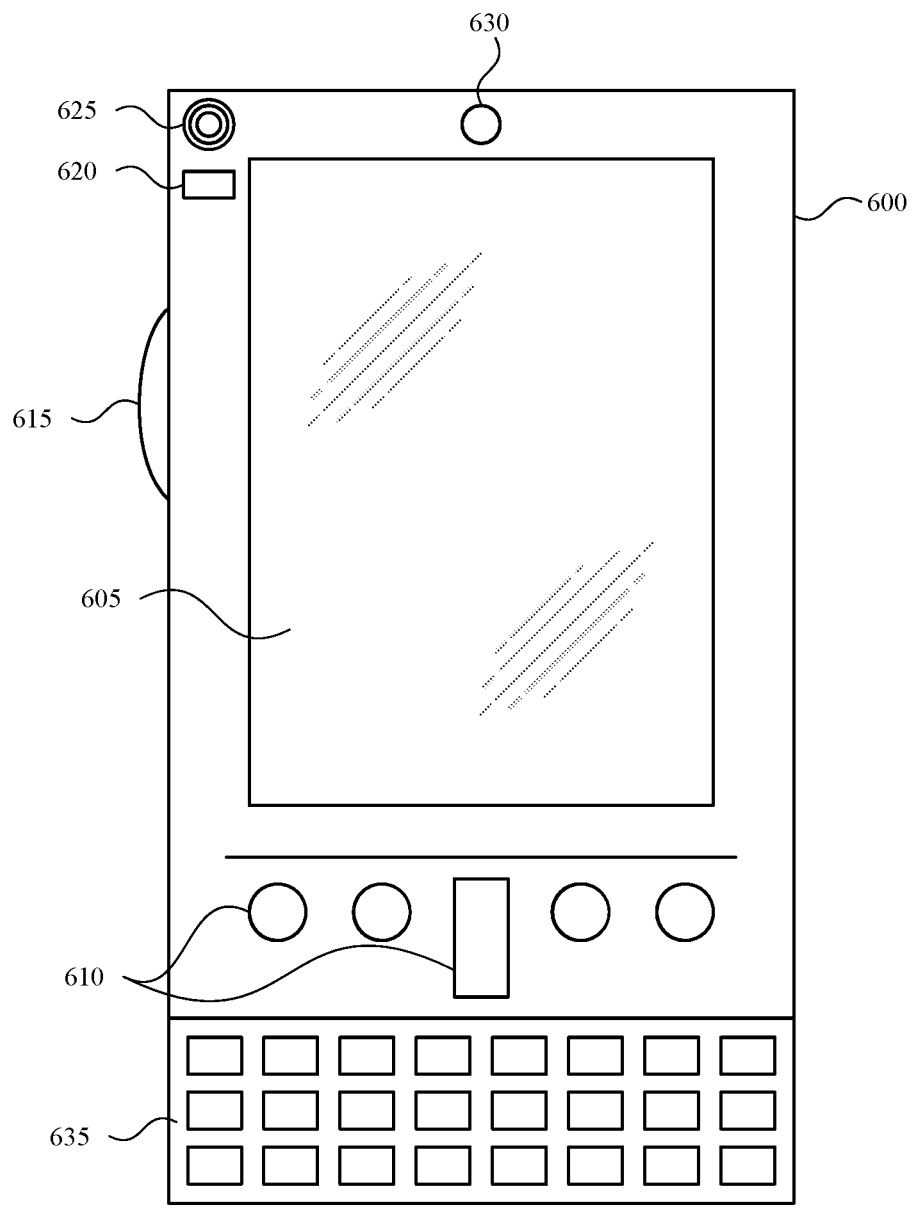
FIGS. 6A and 6B are simplified block diagrams of a mobile computing device with which aspects of the present disclosure may be practiced.
Figure 6B:
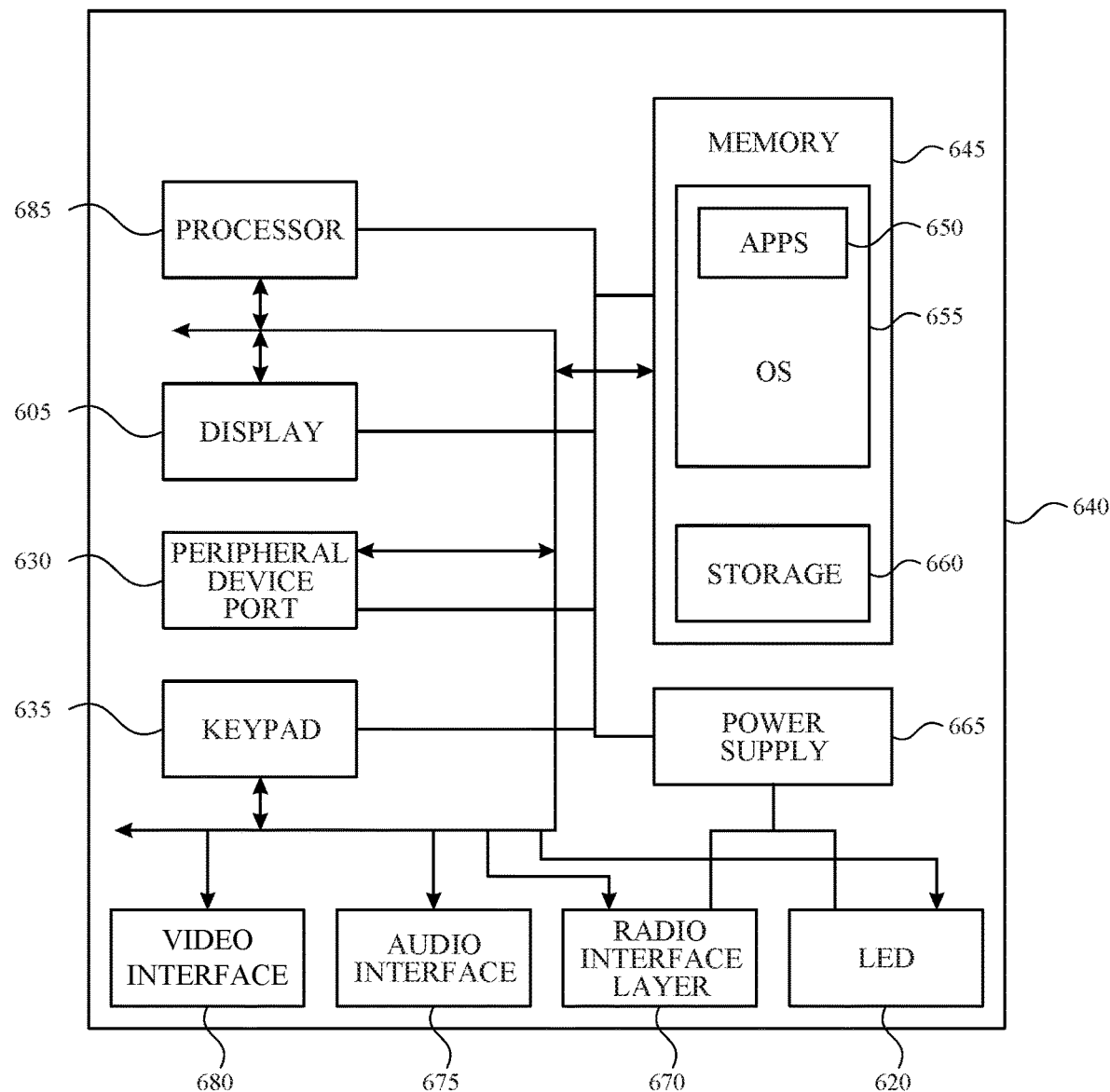

FIG. 6A-FIG. 6B illustrate a mobile computing device 600, for example, a mobile telephone, a smart phone, wearable computer (such as a smart watch), a tablet computer, a laptop computer, and the like, with which examples of the disclosure may be practiced. With reference to FIG. 6A, one aspect of a mobile computing device 600 for implementing the aspects is illustrated.

In a basic configuration, the mobile computing device 600 is a handheld computer having both input elements and output elements. The mobile computing device 600 typically includes a display 605 and one or more input buttons 610 that allow an individual to enter information into the mobile computing device 600. The display 605 of the mobile computing device 600 may also function as an input device (e.g., a display that accepts touch and/or force input).

If included, an optional side input element 615 allows further input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various examples, the output elements include the display 605 for showing a graphical user interface (GUI) (such as the one described above that provides visual representation of a determined pronunciation and may receive feedback or other such input, a visual indicator 620 (e.g., a light emitting diode), and/or an audio transducer 625 (e.g., a speaker). In some aspects, the mobile computing device 600 incorporates a vibration transducer for providing an individual with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device 600. That is, the mobile computing device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the individual takes action to indicate the powered-on status of the device.

The audio interface 675 is used to provide audible signals to and receive audible signals from the individual (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile computing device 600 implementing the system 640 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile computing device 600 and stored via the system 640 may be stored locally on the mobile computing device 600, as described above, or the data may be stored on any number of storage media that may be accessed by the device via the radio interface layer 670 or via a wired connection between the mobile electronic device 600 and a separate electronic device associated with the mobile computing device 600, for example, a server computer in a distributed computing network, such as the Internet. As should be appreciated such data/information may be accessed via the mobile computing device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
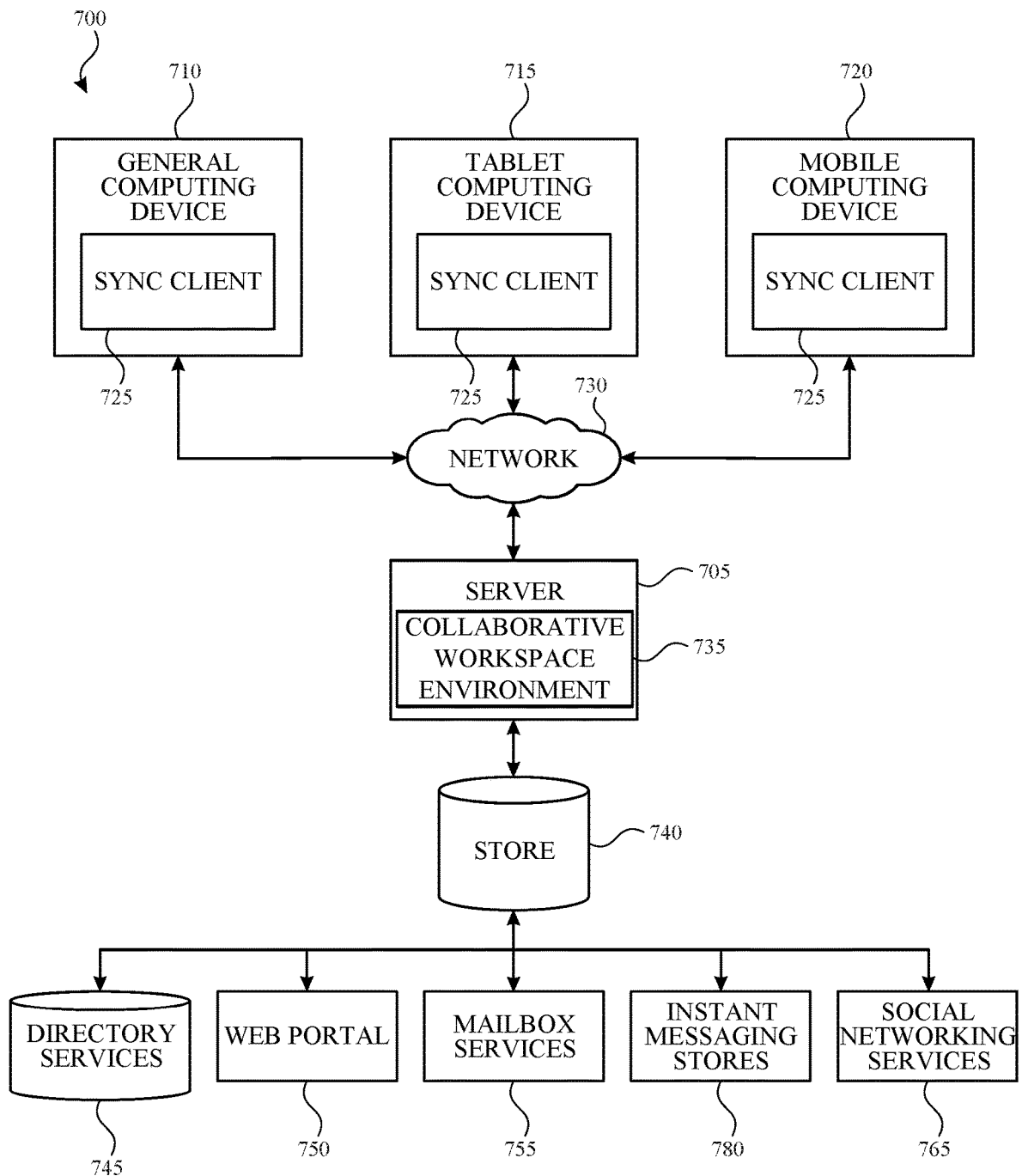
FIG. 7 is a simplified block diagram of a distributed computing system in which aspects of the present disclosure may be practiced.

FIG. 7 illustrates one aspect of the architecture of a system 700 for automatically synchronizing virtual file systems such as described above. The system 700 may include a general computing device 710 (e.g., personal computer), tablet computing device 715, or mobile computing device 720, as described above. Each of these devices may include a synchronization client 725 such as described herein.

In some aspects, each of the general computing device 710 (e.g., personal computer), tablet computing device 715, or mobile computing device 720 may receive various other types of information or content that is stored by or transmitted from a directory service 745, a web portal 750, mailbox services 755, instant messaging stores 760, or social networking services 765.

In aspects, and as described above, each computing device may have access to a collaborative workspace environment 735 that is provided on a server 705, the cloud or some other remote computing device.

By way of example, the aspects described above may be embodied in a general computing device 710, a tablet computing device 715 and/or a mobile computing device 720. Any of these examples of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
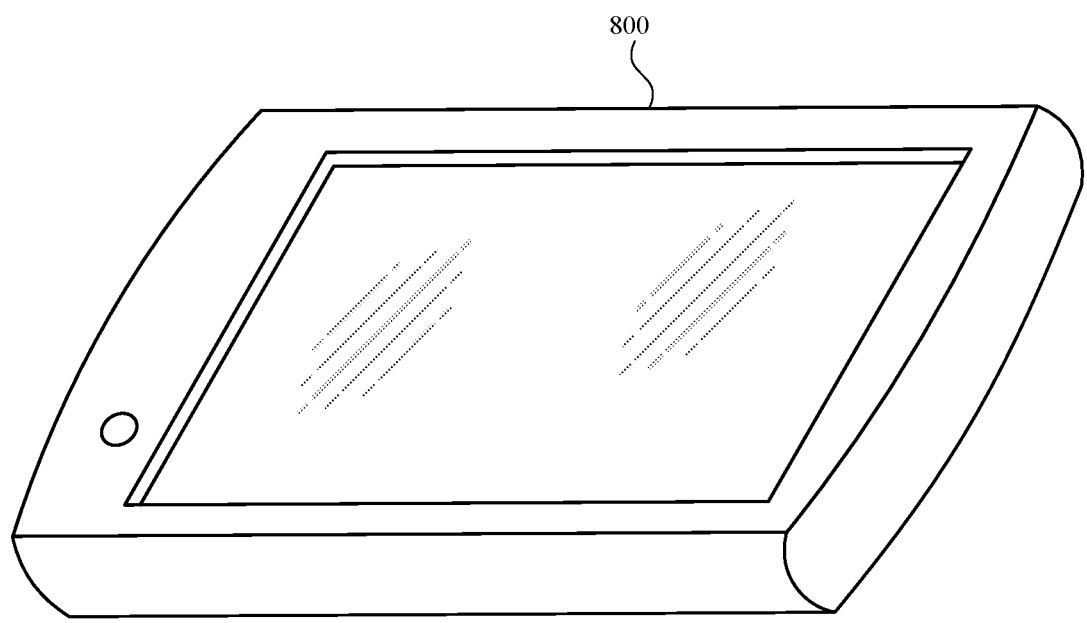
FIG. 8 illustrates a tablet computing device for executing one or more aspects of the present disclosure.

FIG. 8 illustrates an example tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting gestures for controlling the functionality of the electronic device, and the like.

As should be appreciated, the figures herein FIG. 8 is described for purposes of illustrating the present methods and systems and is not intended to limit the disclosure to a particular sequence of steps or a particular combination of hardware or software components.

Aspects described herein are directed to a method, comprising: generating a request for a list of queries associated with a virtual file system hosted on a collaborative workspace environment; receiving the list of queries from the collaborative workspace environment; generating one or more folders on a local file system, wherein each of the one or more folders corresponds to at least one query in the list of queries; generating a request for content that is associated with each query in the list of queries; and receiving the content from the collaborative workspace environment. In some aspects, receiving the content comprises receiving a placeholder for the content. In some aspects, the method also includes downloading the actual content when the placeholder for the content is selected. In some aspects, receiving the content comprises receiving a hard link associated with the content. In some aspects, receiving the content comprises receiving a symlink associated with the content. In some aspects, the method also includes generating an update request for at least one query in the list of queries. In some aspects, the method also includes receiving updated content in response to the update request. In some aspects, the method also includes updating at least one folder of the one or more folders using the updated content. In some aspects, the list of queries is specified by an individual that has access to the collaborative workspace environment.

Also described is a method, comprising: generating, by a local computing device, a request for one or more changes to a list of queries associated with a virtual file system hosted on a remote computing device, wherein the list of queries is also stored on the local computing device; receiving, from the remote computing device, a list of the one or more changes to the list of queries; and determining, by the local computing device whether to: download content associated with the one or more changes to the list of queries; delete content associated with the one or more changes to the list of queries; create an entry in a folder associated with the content; or move content associated with the one or more changes to the list of queries. In some aspects, the method includes updating a folder associated with a query in the list of queries based, at least in part, on the one or more changes to the list of queries. In some aspects, the one or more changes to the list of queries includes one or more changes to one or more content items provided in the list of queries. In some aspects, the method also includes providing a synchronization token to the remote computing device that indicates when a previous request was transmitted to the remote computing device. In some aspects, downloading content associated with the one or more changes to the list of queries comprises downloading a placeholder associated with the content. In some aspects, downloading content associated with the one or more changes to the list of queries comprises downloading a hard link associated with the content. In some aspects, downloading content associated with the one or more changes to the list of queries comprises downloading a symlink associated with the content.

Also described is a system, comprising: at least one processor; and a memory coupled to the at least one processor and storing instructions that, when executed by the at least one processor, perform a method, comprising: generating a request for a list of queries associated with a virtual file system hosted on a collaborative workspace environment; receiving the list of queries from the collaborative workspace environment; generating one or more folders on a local file system, wherein each of the one or more folders corresponds to at least one query in the list of queries; generating a request for content that is associated with each query in the list of queries; and receiving the content from the collaborative workspace environment. In some aspects, receiving the content comprises receiving a placeholder for the content. In some aspects the system also includes instructions for downloading the actual content when the placeholder for the content is selected. In some aspects, receiving the content comprises receiving at least one of a hard link associated with the content and a symlink associated with the content.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
generating a request to discover a list of queries supported by a virtual file system hosted on a collaborative workspace environment, the list of queries including one or more queries that are associated with content hosted by the collaborative workspace environment;
providing the request to discover the list of queries to the collaborative workspace environment;
receiving the list of queries from the collaborative workspace environment;
generating one or more folders on a local file system, wherein each of the one or more folders corresponds to a respective one of the one or more queries in the list of queries;
generating a request for content associated with one of the one or more queries in the list of queries;
providing the request for content to the collaborative workspace environment;
receiving the requested content from the collaborative workspace environment;
storing the received content in a corresponding folder of the one or more folders; and
periodically synchronizing content stored in the corresponding folder with content received from subsequent requests for content associated with the one of the one or more queries.

2. The method of claim 1, wherein receiving the content comprises receiving a placeholder for the content.

3. The method of claim 2, further comprising downloading the actual content when the placeholder for the content is selected.

4. The method of claim 1, wherein receiving the content comprises receiving a hard link or a symlink associated with the content.

5. The method of claim 1, further comprising generating an update request for at least one query in the list of queries.

6. The method of claim 5, further comprising receiving updated content in response to the update request and updating at least one folder of the one or more folders using the updated content.

7. The method of claim 1, wherein a local file system tree of the local file system is synchronized with a cloud file system tree, and wherein the request for content is for content not stored in the cloud file system tree.

8. The method of claim 7, wherein the cloud file system tree is associated with a user, and wherein the received content has been shared with the user.

9. The method of claim 8, wherein the received content originates from a second cloud file system tree associated with a second user, and wherein the received content is stored in the local file system outside of the local file system tree.

10. The method of claim 1, wherein a local file system tree of the local file system is synchronized with a cloud file system tree, wherein the request for content comprises a request for content that is stored in the cloud file system tree, and wherein the received content is stored in multiple locations on the local file system tree.

11. The method of claim 10, wherein one of the one or more queries returns a list of files that were most recently used.

12. The method of claim 10, further comprising:
synchronizing the received content between the multiple locations on the local file system.

13. The method of claim 10, wherein a first location of the multiple locations is within the local file system tree, and wherein a second location of the multiple locations is outside of the local file system tree.

14. A method, comprising:
generating, by a local computing device, a request to discover one or more changes to a list of queries supported by a virtual file system hosted on a remote computing device, wherein the list of queries includes one or more queries that are associated with content hosted by a collaborative workspace environment and wherein the list of queries is also stored on the local computing device;

generating one or more folders on a local file system of the local computing device to store content retrieved by executing the one or more queries;

providing the request to discover the list of queries to the collaborative workspace environment;

periodically receiving, from the remote computing device, a list of the one or more changes to the list of queries; and periodically synchronizing content stored in the one or more folders by determining, by the local computing device whether to:
- download content associated with the one or more changes to the list of queries;
- delete content associated with the one or more changes to the list of queries;
- create an entry in a folder associated with the content; or
- move content associated with the one or more changes to the list of queries.

15. The method of claim 14, further comprising updating a folder associated with a query in the list of queries based, at least in part, on the one or more changes to the list of queries.

16. The method of claim 14, wherein the one or more changes to the list of queries includes one or more changes to one or more content items provided in the list of queries.

17. The method of claim 14, wherein downloading content associated with the one or more changes to the list of queries comprises downloading a placeholder associated with the content.

18. A system, comprising:
- at least one processor; and
- a memory coupled to the at least one processor and storing instructions that, when executed by the at least one processor, perform a method, comprising:
  - generating a request to discover a list of queries supported by a virtual file system hosted on a collaborative workspace environment, the list of queries including one or more queries that are associated with content hosted by the collaborative workspace environment;
  - providing the request to discover the list of queries to the collaborative workspace environment;
  - receiving the requested list of queries from the collaborative workspace environment;
  - generating one or more folders on a local file system, wherein each of the one or more folders corresponds to a respective one of the one or more queries in the list of queries;
  - generating a request for content associated with one of the one or more queries in the list of queries;
  - providing the request for content to the collaborative workspace environment;
  - receiving the requested content from the collaborative workspace environment;
  - storing the received content in a corresponding folder of the one or more folders and
  - periodically synchronizing content stored in the corresponding folder with content received from subsequent requests for content associated with the one of the one or more queries.

19. The system of claim 18, further comprising instructions for downloading the actual content when the placeholder for the content is selected.

20. The system of claim 18, wherein receiving the content comprises receiving at least one of a hard link associated with the content and a symlink associated with the content.

* * * * *